US009292063B2

United States Patent
Meinecke (10) Patent No.: US 9,292,063 B2
(45) Date of Patent: Mar. 22, 2016

(54) ON-LOAD TAP CHANGER CONTROL METHOD FOR A POWER EXCITATION CHAIN, RELATED UNIT AND POWER EXCITATION CHAIN COMPRISING SUCH UNIT

(71) Applicant: ALSTOM Technology Ltd, Baden (CH)

(72) Inventor: Carsten Meinecke, Karlsruhe (DE)

(73) Assignee: ALSTOM Technology Ltd, Baden (CH)

( * ) Notice: Subject to any disclaimer, the term of this patent is extended or adjusted under 35 U.S.C. 154(b) by 281 days.

(21) Appl. No.: 13/951,521

(22) Filed: Jul. 26, 2013

(65) Prior Publication Data

US 2013/0310993 A1  Nov. 21, 2013

Related U.S. Application Data

(63) Continuation of application No. PCT/EP2012/050475, filed on Jan. 13, 2012.

(30) Foreign Application Priority Data

Jan. 31, 2011 (EP) .................................. 11152801

(51) Int. Cl.
*G06F 1/26* (2006.01)
*H02J 3/18* (2006.01)

(52) U.S. Cl.
CPC ................ *G06F 1/26* (2013.01); *H02J 3/1878* (2013.01); *Y02E 40/30* (2013.01)

(58) Field of Classification Search
CPC ............. H02J 3/1878; G05F 1/70; G06F 1/26
See application file for complete search history.

(56) References Cited

U.S. PATENT DOCUMENTS

| | | | | |
|---|---|---|---|---|
| 5,977,731 A | * | 11/1999 | Xia ......................... | H02P 9/105 318/147 |
| 6,323,618 B1 | * | 11/2001 | Kitamura .............. | H02J 3/1885 318/700 |
| 6,919,712 B1 | * | 7/2005 | Kitamura ................ | H02P 9/305 322/19 |

(Continued)

FOREIGN PATENT DOCUMENTS

| | | |
|---|---|---|
| CN | 101615796 A | 12/2009 |
| GB | 2410386 A | 7/2005 |
| RU | 2324994 C2 | 5/2008 |

OTHER PUBLICATIONS

Corsi, "*Wide Area Voltage Regulation & Protection*", Powertech, 2009 IEEE Bucharest Power Tech Conference, Jun. 28-Jul. 2, 2009.

(Continued)

*Primary Examiner* — Jue Zhang (57) ABSTRACT

The present invention relates to an on-load tap changer control method for a power excitation chain. The chain includes a generator, a step-up transformer equipped with an on-load tap changer and connected on the one hand to the output of the generator and on the other hand to a transmission bus, and an excitation control system with a generator automatic voltage regulator (AVRG) and one excitation limiter (OELG, UELG). The method monitors the excitation conditions of the generator, activates the one excitation limiter (OELG, UELG) when the monitored excitation conditions are outside a predefined range, and temporarily inhibits the change of step of the on-load tape changer.

14 Claims, 4 Drawing Sheets

(56) References Cited

U.S. PATENT DOCUMENTS

2008/0052059 A1* 2/2008 Kim .................... G01R 31/343
 703/13
2013/0307494 A1* 11/2013 Meinecke ............. H02J 3/1878
 323/205

OTHER PUBLICATIONS

Vournas, et al., "Comparison and Combination of Emergency Control Methods for Voltage Stability", Power Engineering Society General Meeting 2004, Jun. 6, 2004.

* cited by examiner

ON-LOAD TAP CHANGER CONTROL METHOD FOR A POWER EXCITATION CHAIN, RELATED UNIT AND POWER EXCITATION CHAIN COMPRISING SUCH UNIT

CROSS-REFERENCE TO RELATED APPLICATIONS

This application claims priority to PCT/EP2012/050475 filed Jan. 13, 2012, which in turn claims priority to European Application 11152801.4 filed Jan. 31, 2011, both of which are hereby incorporated in their entireties.

TECHNICAL FIELD

The present invention relates to an on-load tap changer control method for a power excitation chain, a related unit and a power excitation chain comprising such a unit. It can be used in particular in power plants for generation of electrical power.

BACKGROUND

In power plants, generators are coupled for example to a transmission bus or a grid through step-up transformers equipped with On-Load Tap Changers (OLTC), sometimes including an automatic tap control function.

This allows changing taps and thus the transformation ratio of the step-up transformer. It is common practice to use on-load tap changers to adjust the reactive power output of a generating unit when it is synchronized to the grid. The output of reactive power is often requested by the transport grid operator, and may be specified e.g. in a grid code, or on day-to-day basis.

On the other hand, it is desirable to keep the voltage on the generator terminals constant at its nominal value. This has the advantage that the generator has its full dynamic regulating capability, and the station supply, that is often connected to the generator terminals, is operating at nominal voltage as well.

These criteria can be met, if an automatic voltage regulator (AVR) in the excitation system of the generator maintains the generator voltage at nominal value, while the reactive power supplied to the grid is adjusted via the OLTC.

On-load tap changers are severe duty motor-driven switching systems, requiring arcing contacts and bypass contacts to ensure continuity while switching from one tap to another. The voltage change from one tap to another is typically less than 1%, and OLTCs have quite several tens of taps to provide a reasonable range of operation.

The control of OLTCs of step-up transformers is today commonly done automatically upon voltage measurements on the output side of the step up transformer, employing an automatic voltage regulator associated to the OLTC. The reference value for the voltage regulator has to be set manually by the operator staff, until the specified reactive power output to the grid is achieved. As soon as the grid condition or the operating regime of the generator changes, the reference value has to be re-adjusted.

In the state of the art, the step up transformer and its OLTC is equipped with a proper regulator. This regulator is an automatic voltage regulator (AVR) coupled with an input to the transformer output voltage and driving the motors of the OLTC automatically.

This known solution, which requires dedicated hardware for the OLTC regulator and instrument transformers for measuring the secondary current and voltage of the transformer, is quite cost intensive.

In addition, dysfunctions in conjunction with long term voltage drops in the transmission grid have been observed.

The present applicant has studied in detail these phenomena and could establish surprisingly, that they are due to uncoordinated interactions of generator excitation limiters and OLTC control.

When the generator over-excitation limiter (OEL) reduces the excitation current in the generator to prevent excessive thermal load in the rotor and/or stator windings, the terminal voltage of the generator is reduced. As a result, the station supply of the unit may become unstable and eventually trip the whole unit.

Furthermore, the OLTC control may compromise stable operation of the generator in the under-excited operating regime, if not co-ordinated with the generator excitation control.

SUMMARY

One object of the present invention is to prevent undesirable influence of excitation limiters of AVRs in scenarios of long term voltage drops in the transport grid.

This is achieved by an on-load tap changer control method for a power excitation chain, said chain comprising
  a generator,
  a step-up transformer equipped with an on-load tap changer and connected on the one hand to the output of said generator and on the other hand to a transmission bus, and
  an excitation control system comprising a generator automatic voltage regulator and at least one excitation limiter, comprising the following steps:
  monitoring the excitation conditions of the generator,
  activating said at least one excitation limiter when the monitored excitation conditions are outside a predefined range,
  inhibiting temporarily the change of step of said on-load tape changer, when said excitation limiter is active.

Thus, undesirable influence of excitation limiters of AVRs in scenarios of long term voltage drops in the transport grid can be eliminated just at the beginning. In addition, the method is easy to implement and does not need important resources.

According to further aspects of the invention take alone or in combination:

The excitation limiter is for example an over-excitation limiter, and said monitoring step of excitation conditions comprises monitoring the generator stator current or the generator excitation current, and the step of temporally inhibition of change of step of said on-load step changer comprises to block step up of said on-load tap changer.

Furthermore, said over-excitation limiter is for example activated when the monitored generator stator current or the generator excitation current exceed a maximum value.

According to a further aspect, the method comprises a further step of calculation of the remaining time for the over-excitation limiter to send out an excitation current control command, and to step down said on-load step changer when said remaining time is equal or lower to a predefined minimum remaining time value.

According to another aspect, the excitation limiter is an under-excitation limiter and said monitoring step of excitation conditions comprises monitoring the stability operation regime of the generator, and the step of temporally inhibition of change of step of said on-load tap changer comprises to block step down of said on-load tap changer.

According to another aspect said under-excitation limiter is activated when the monitored stability operation regime is close to a predetermined stability limit.

The on-load tap changer control method for a power excitation chain may comprise a further step of monitoring the generator stator voltage, and to step up said on-load step changer when said generator voltage is equal or exceeds to a predefined maximum generator stator voltage.

Furthermore, the on-load tap changer control method for a power excitation chain might comprise the following further steps:
  measuring the generator voltage and generator current,
  processing said measured generator voltage and generator current in order to derive a control parameter for controlling said on load tap changer,
  controlling said on-load tap changer.

Said control parameter may be the secondary voltage of said step-up transformer.

The invention also relates to an on-load tap changer control unit for a power excitation chain, said chain comprising
  a generator,
  a step-up transformer equipped with an on-load tap changer and connected on the one hand to the output of said generator and on the other hand to a transmission bus, and
  an excitation control system comprising a generator automatic voltage regulator and at least one excitation limiter, said excitation control system being configured to monitor the excitation conditions of the generator and to activate said at least one excitation limiter when the monitored excitation conditions are outside a predefined range,
where said on-load tap changer control unit comprises means configured to inhibit temporarily the change of step of said on-load tap changer, when said excitation limiter is active.

The invention also relates to a power excitation chain comprising
  a generator,
  a step-up transformer equipped with an on-load tap changer and connected on the one hand to the output of said generator and on the other hand to a transmission bus, and
  an excitation control system comprising a generator automatic voltage regulator and at least one excitation limiter, said excitation control system being configured to monitor the excitation conditions of the generator and to activate said at least one excitation limiter when the monitored excitation conditions are outside a predefined range, and
an on-load tap changer control unit comprising means configured to inhibit temporarily the change of step of said on-load tap changer, when said excitation limiter is active.

According to a further aspect, said excitation control system comprises an over-excitation limiter and an under-excitation limiter.

Said on-load tap changer control unit is for example implemented in said generator excitation control system.

The excitation control system may further comprise
  at least one input connectable to the generator for measuring the generator voltage and generator current, and
  at least one processing unit to control the excitation of the generator in function of the measured generator voltage and generator current,
wherein
  said at least one processing unit comprising said on-load tap changer control unit, is connected to said on load tap changer and is furthermore configured to derive from said measured generator voltage and generator current a control parameter for controlling said on load tape changer.

DETAILED DESCRIPTION

In all figures, same reference numerals refer to the same elements.

Figure 1A:
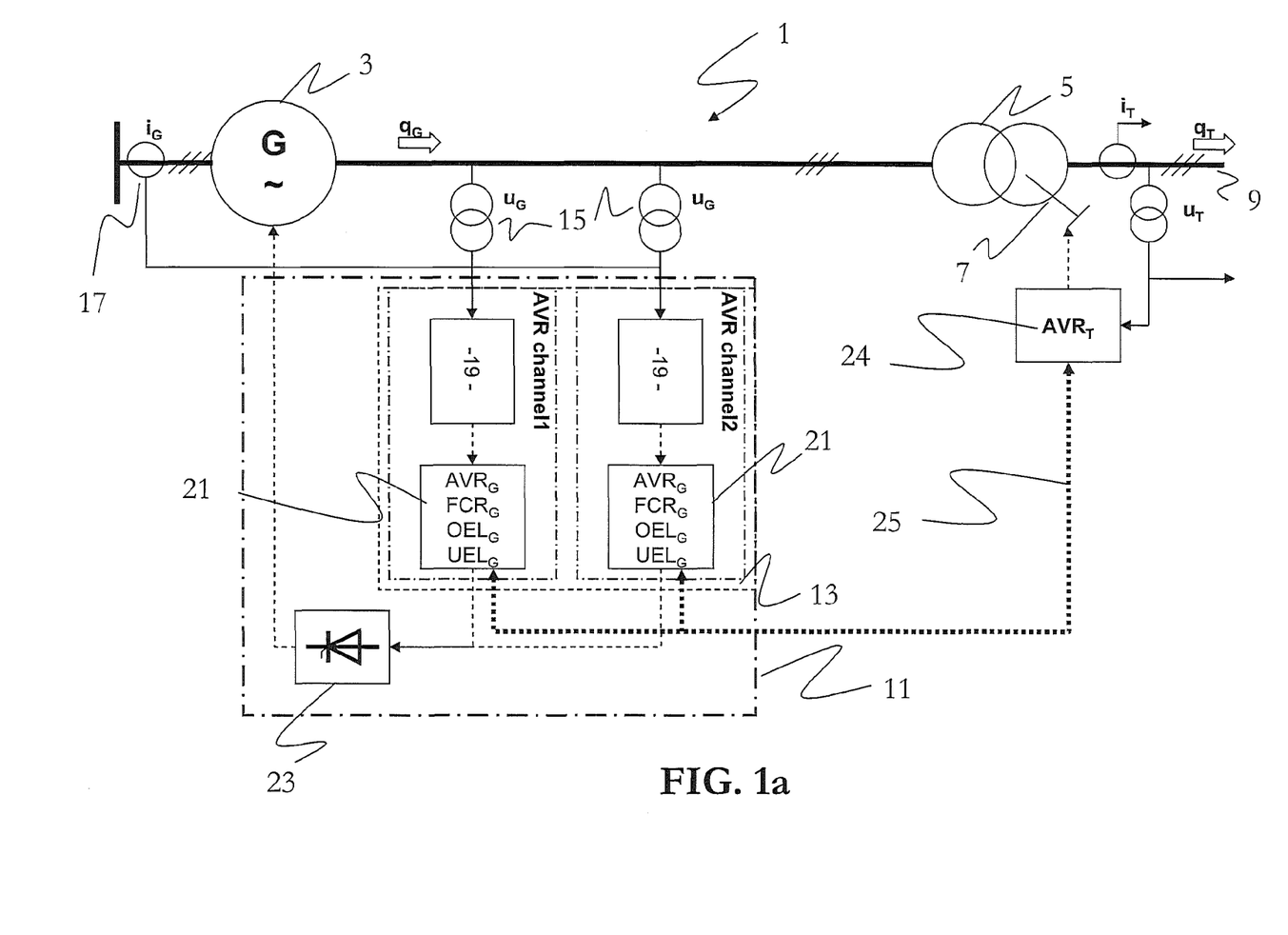
FIG. 1a and FIG. 1b are schematic representations of a part of a power excitation chain according to the invention.
Figure 1B:
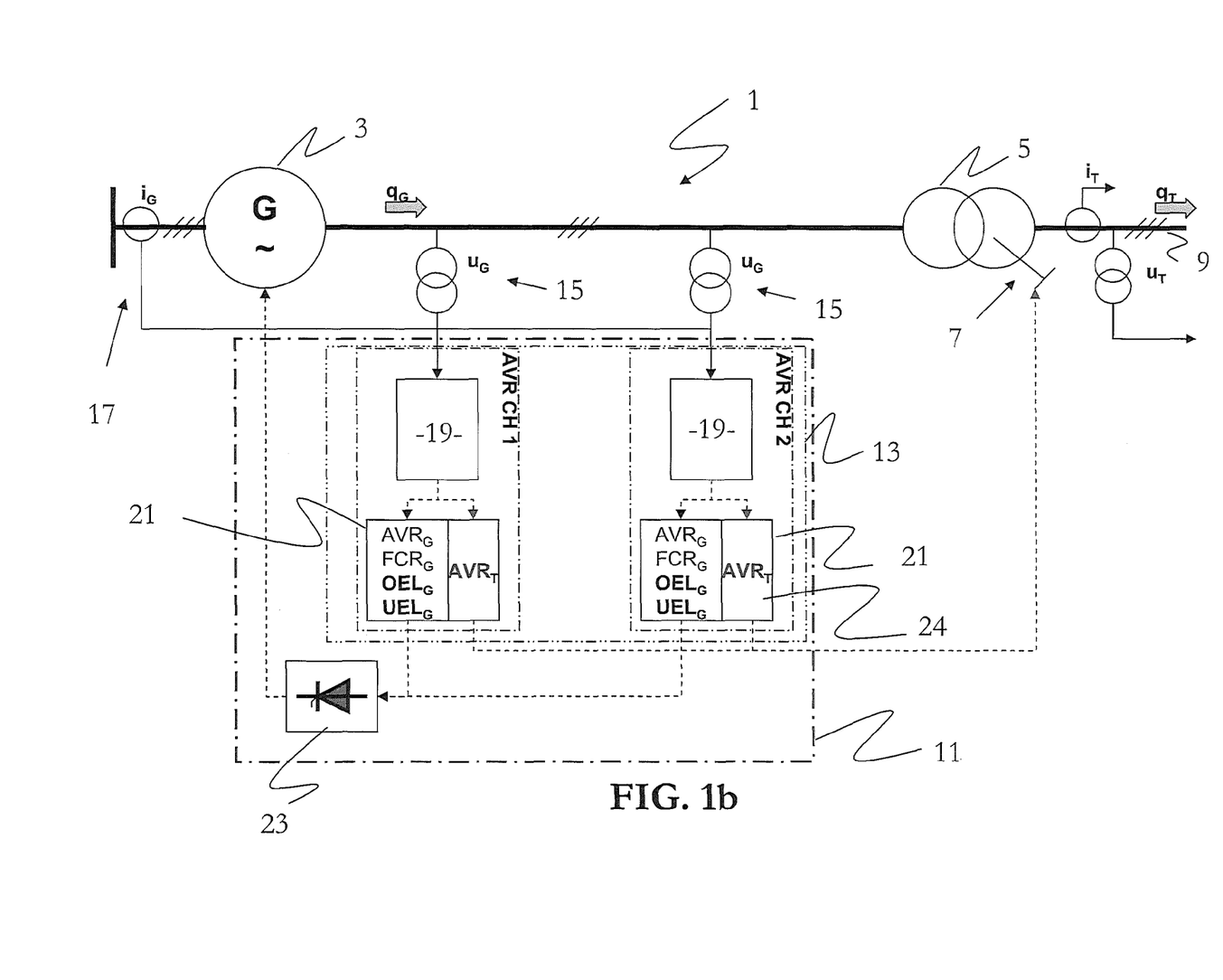

FIG. 1a and FIG. 1b are schematic representations of a part of a power excitation chain 1, for example implemented in a power plant.

This power excitation chain 1 comprises a generator 3 transforming mechanical energy into electrical energy. The generator 3 may be driven by not represented turbines or engines fed by any available energy source or combination of energy sources (coal, fuel, gas, nuclear, steam, wind, water, sun, hydrological etc). The generator may be a synchronous generator.

The output of the generator 3 is connected to a step-up transformer 5 equipped with an on-load tap changer (OLTC) 7 and an associated OLTC regulator or control unit 24.

The output of the step-up transformer 5 is connected to a transmission bus 9, and therefore directly for example to the grid (not represented).

The power excitation chain 1 further comprises a generator excitation control system 11.

This generator excitation control system 11 comprises a processing unit 13 with at least one, but for security reasons preferentially two redundant automatic voltage regulation channels AVR CH1 and AVR CH2.

AVR CH1 and AVR CH2 have inputs that are respectively connected to measurement units 15, 17 (for example instrument transformers or Rogowski coils) for measuring the generator voltage $u_G$ and generator current $i_G$.

AVR CH1 and AVR CH2 comprise a signal processing unit 19 configured for example to filter the measurement signals, to convert them from analogue to digital values, and to calculate derived quantities, such as active and reactive power, power factor etc.

The digital values out of said signal processing unit 19 are fed into respective calculation processing and control units 21.

Such a calculation processing and control unit 21 is configured and programmed as a generator automatic voltage regulator $AVR_G$, a generator field current regulator FCR, a generator over-excitation limiter $OEL_G$ and a generator under-excitation limiter $UEL_G$. It may comprise further functions, such as an over-fluxing limiter, or a power system stabilizer.

These calculation processing and control units 21 are then connected to a power section 23 for controlling the power section 23 and therefore excitation of the generator 3 in function of the measured generator voltage $u_G$ and generator current $i_G$.

Such a calculation processing and control unit 21 may be a computer or a microprocessor based calculation unit.

The co-ordination of the generator excitation control and the OLTC control requires a data exchange line 25 via an interface between the calculation processing and control units 21 and the OLTC regulator or control unit 24.

As shown in FIG. 1a, the OLTC control unit 24 is a separate control unit or a stand alone solution as shown in FIG. 1a.

With reference to FIG. 1b, part of the calculation processing and control unit 21 can also be used and configured as an on-load tap changer control unit 24, see FIG. 1b. In this case, calculation processing and control unit 21 is therefore connected to said on-load tap changer 7, and the data exchange between the excitation control function and the OLTC control function is provided within the calculation processing and control units 21.

Indeed, in taking advantage of a surprising synergy effect in the co-ordination of the regulation process of the whole power excitation chain, in particular with the generator over-excitation limiter $OEL_G$ and the generator under-excitation limiter $UEL_G$, undesirable influences in scenarios of long-term voltage drops in the transport grid may be avoided.

Therefore, the processing unit 13 and in particular its calculation processing and control unit 21 are configured to provide an on-load tap changer control method for said power excitation chain 1 comprising the following steps:
  monitoring the excitation conditions of the generator (3),
  activating said at least one excitation limiter when the monitored excitation conditions are outside a predefined range,
  inhibiting temporarily the change of step of said on-load tap changer 7, when said excitation limiter either $OEL_G$ or $UEL_G$ is active.

In case, where the excitation limiter is an over-excitation limiter $OEL_G$, said monitoring step of excitation conditions comprises monitoring for example the generator stator current $i_G$ or the generator excitation current $i_f$, and the step of temporally inhibition of change of step of said on-load step changer comprises to block step up of said on-load step changer.

This blocking of step up of the on-load step changer allows preventing that the generator gets in an even more excited regime.

The over-excitation limiter is activated for example when
  the monitored generator excitation current $i_f$ exceeds a maximum value $i_{fmax}$, or
  the monitored generator stator current $i_G$ exceeds a maximum value $i_{Gmax}$, while the synchronous generator is in the over-excited operating regime.

More specifically, the calculation processing and control unit 21 might further carry out calculations of the remaining time for the over-excitation limiter to send out an excitation current control command to the power section 23, and to control step down said on-load step changer 7 when said remaining time is equal or lower to a predefined minimum remaining time value, $T_{rem,lim}$.

Said predefined minimum remaining time value $T_{rem,lim}$ is to be chosen in the range of the delay time between sending out a tap-change command and the actual change in transformer voltage, ensuring that the transformer voltage changes before the excitation limiter reduces the excitation current. This time value may be in the range of 1.5 s to 5 s, according to the response time of the used OLTC.

The remaining time until the $OEL_G$ starts to reduce the excitation current must be calculated. This calculation can be based on the same algorithm as used for the $OEL_G$ itself.

Methods are e.g.
  define a fixed ceiling time (typically 10 s), independent of the field or stator current
  define an integral criterion $\int(i^2-1)dt$, which represents the thermal effect of the currents on the field winding or stator winding, respectively. In this case, the quantity i is the current through the field winding or stator winding of the generator, normalized to the maximum permissible continuous current through the respective winding.

For example, an over-excitation criterion might be:

$$\int(i^2(t)-1)dt < C_{limit}$$

The current remaining time $T_{rem}$ (t) can then be calculated as follows:

$$T_{rem}(t) = \left(C_{limit-} \int (i^2(t')-1)dt'\right) / (i^2(t)-1)$$

Where t' denotes the time as integration variable, and $\int(i^2(t')-1)dt'$ being limited to a maximum value of $C_{limit}$ and a minimum value of "0" (zero).

In case of the under-excitation limiter $UEL_G$, the monitoring step of excitation conditions comprises monitoring the actual reactive power output versus the actual active power output with respect to the region of stable operation in the power chart of the generator 3, and the step of temporally inhibition of change of step of said on-load step changer 7 comprises to block step down of said on-load tap changer 7.

This allows to prevent that the generator 3 runs in to the unstable operation regime by stepping down the OLTC.

The under-excitation limiter is activated when the monitored reactive power output is close to the maximum under-excited reactive power output according to the power chart of the generator 3 for the actual active power output.

In addition, the method comprises a further step of monitoring the generator stator voltage and to step up said on-load step changer 7 when the generator voltage is equal to or exceeds a predefined maximum generator stator voltage $U_{G,lim}$ in case of the $UEL_G$ being active.

This predefined maximum generator stator voltage $U_{G,lim}$ is to be chosen according to the maximum permissible continuous output voltage of the generator, which is commonly in the range of 105 . . . 110% of the nominal generator voltage $u_{GN}$. For example, a reasonable setting for a generator with a maximum permissible continuous output voltage of 105% would be 103 . . . 104%. This setting ensures that the $UEL_G$ remains capable of moving the operating point of the generator towards the over-excited region, if necessary, without exceeding the maximum output voltage.

Figure 2:
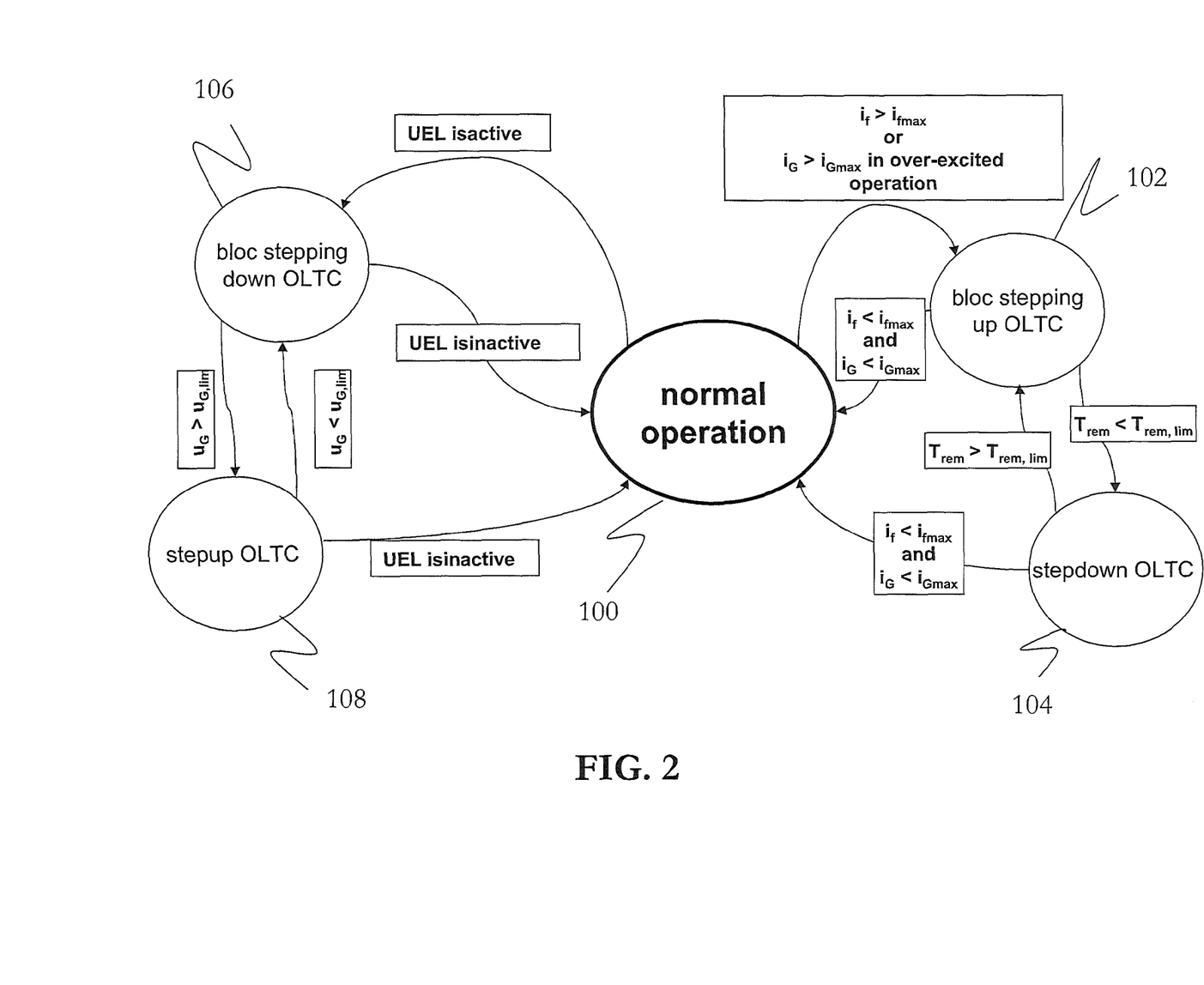
FIG. 2 is a schematic representation of a state graph for illustrating operation of a power excitation according to the invention.

FIG. 2 shows a state graph of operation and control of the power excitation chain 1 of the FIGS. 1a and 1b.

It is assumed that the power chain 1 is in normal operation mode 100.

If $i_f > i_{fmax}$, or $i_G > i_{Gmax}$, while the generator is in over-excited operation, where
  $i_f$ is the generator excitation current,
  $i_{fmax}$ is the maximum continuous generator excitation current,
  $i_G$ is the generator stator current,
  $i_{Gmax}$ is maximum continuous stator excitation current
then processing unit 13 will send out a control command to block stepping up of the OLTC 7 temporarily (step 102). In this context, "temporarily" means until $i_f < i_{fmax}$ and $i_G < i_{Gmax}$ and therefore the power excitation chain can operate in its normal operation regime 100.

In addition, processing unit 13, and more specifically calculation processing and control unit 21 will calculate, as described above, the remaining time $T_{rem}$ before the $OEL_G$ will send out a command to the power section 23. If $T_{rem}$ remaining time is equal or lower to a predefined minimum remaining time value $T_{rem,lim}$, the calculation processing and control unit 21 will in addition send out a tap step down change command the OLTC 7 (step 104), until either the actual value of $T_{rem}$ is larger than $T_{rem,lim}$, or $i_f \leq i_{fmax}$ and $i_G \leq i_{Gmax}$.

On the other hand, if the $UEL_G$ becomes active, processing unit 13 will send out a control command to block stepping up of the OLTC 7 temporarily (step 106). In this case, "temporarily" means until $UEL_G$ becomes inactive.

In addition, processing unit 13, and more specifically calculation processing and control unit 21 will monitor, as described above, if the generator stator voltage exceeds a predefined value $U_{g,lim}$ of for example 104% $u_{GN}$. If this is the case, the calculation processing and control unit 21 will in addition send out tap up commands to the OLTC 7 until the generator stator voltage is lower than the predefined value $U_{g,lim}$ again.

It should be borne in mind that in the above described functionality can be realized for various configurations:

1. The OLTC control is realized in a separate hardware device according to FIG. 1a, requiring an additional data exchange between the OLTC control device and the generator excitation control hardware.
2. The OLTC control is implemented into the generator excitation control hardware 11, using the actual values of the calculation processing and control unit 21 (FIG. 1b)
3. The OLTC control is implemented in a superordinate control system, for example the distributed control system (DCS) of the power plant (not shown), requiring an additional data exchange between the OLTC control device and the DCS, and between the generator excitation control and the DCS.

In particular the second configuration allows cost reduction for hardware, engineering, commissioning and maintenance.

Indeed, the regulator function for OLTC may be completely implemented in processing unit 13, even for normal operation mode.

In this case, the calculation processing and control units 21 may be configured to derive for normal operation mode 100 from said measured generator voltage $u_G$ and generator current $i_G$ a control parameter for controlling said on-load tap changer 7 of the step-up transformer 5.

Said control parameter may be for example the secondary voltage $u_T$ of said step-up transformer 5.

Figure 3:
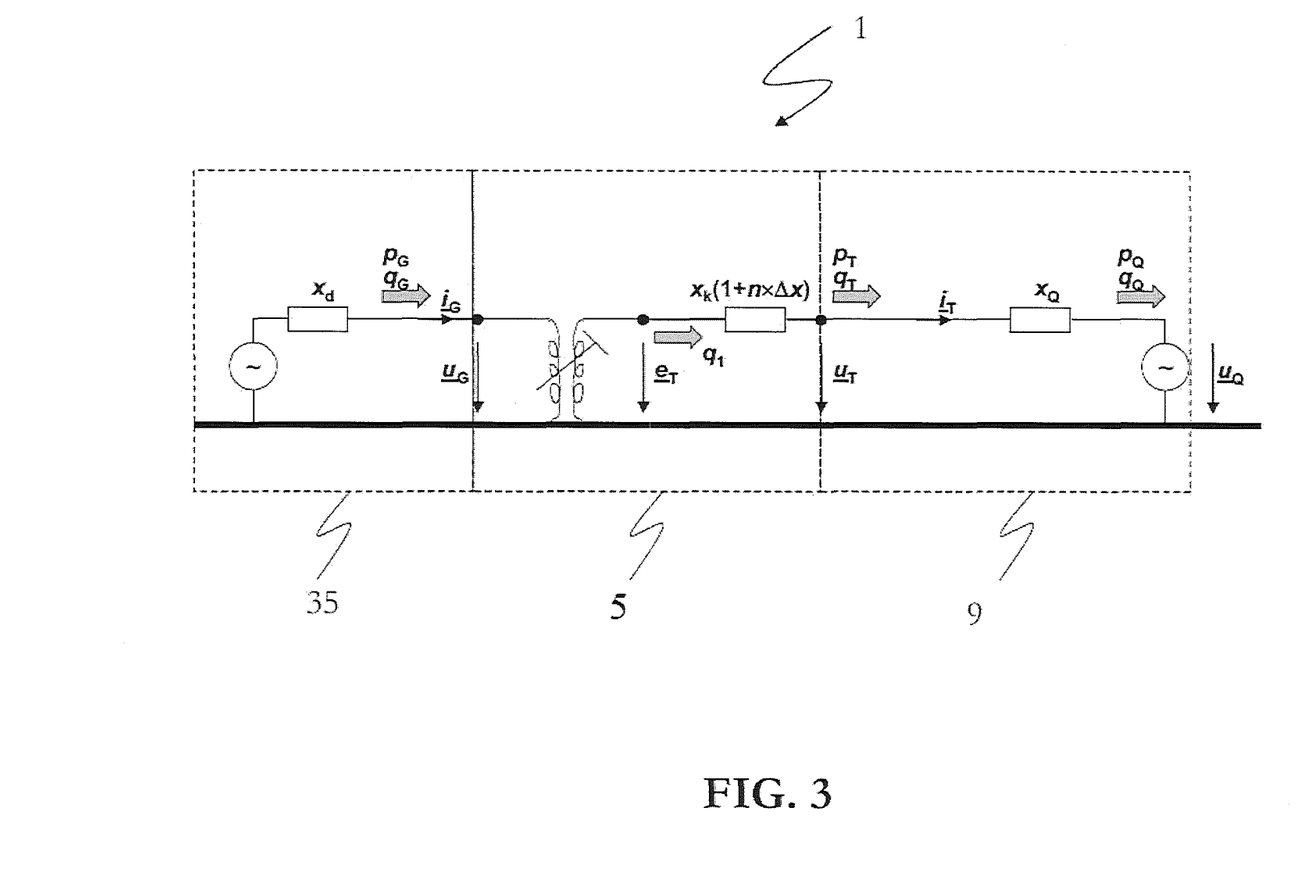
FIG. 3 is an equivalent electric circuit scheme of the power excitation chain of FIG. 1.

FIG. 3 shows an equivalent electric circuit scheme of the power excitation chain of FIG. 1 for explanation purposes.

$u_T$ can not change continuously, but only in discrete steps according to the resolution of the tap-changer and a tap-change command will be given only, if prospective quantity after stepping, i.e. $\underline{u}_T(n\pm 1)$, will be closer to the setpoint than the actual quantity at, i.e. $\underline{u}_T(n)$.

As can be seen on FIGS. 1a, 1b and 3, the measured actual values $u_G$ and $i_G$ are measured on the generator terminals, i.e. on the primary side of the step-up transformer 5.

Moreover, values for control parameter after stepping higher or lower, i.e. $\underline{u}_T(n\pm 1)$, must be known for the regulator algorithm. The values of $\underline{u}_T(n\pm 1)$ depend on the tap-changer position transmission, the actual load flow and, to a lower extent, the condition of the transmission grid.

A reasonable approximation of the value of $u_T(n\pm 1)$ can be calculated, if the influence of the stepping action on the reactive power flow is neglected.

For the calculations, following quantities are defined:
index G quantity on generator terminals
index T quantity on transformer terminals
index Q quantity of grid model or transmission bus
$\underline{u}_i$ complex voltage value
$\underline{i}_i$ complex current value
$\underline{e}_T$ e.m.f. inside step-up transformer
$p_i$ active power value
$q_i$ reactive power value
$\Delta u$ voltage variation by one tap change
$\Delta x$ impedance variation by one tap change
n position of tap changer, where n=0 denotes the middle position Furthermore, it is assumed that:
resistances are neglected→active power is constant throughout model: $p_G = p_T = p_Q = p$
$u_G$ is kept constant by generator AVR
all values in p.u.

The quantities to be calculated concern:
the quantities on secondary side of step-up transformer at actual tap changer position n
voltage $\underline{u}_T(n)$
quantities on secondary side of step-up transformer at tap changer position n±1
voltage $\underline{u}_T(n+1)$, $\underline{u}_T(n-1)$ Available parameters and values are
from measurement:
generator voltage and current $\underline{u}_G$ & $\underline{i}_G$
generator active and reactive power $p_G$ & $q_G$ (with assumption $p_G = p$)
system parameters
transformer reactance $x_k$
variation of e.m.f. with one tap change, $\Delta u$
variation of $x_k$ with one tap change, $\Delta x$
position of tap changer, n, for example via the plant control system.

Thus, with $\underline{e}_T$ defining the real axis, complex electromagnetic calculation with the imaginary part j yields (all values in p.u.)

$$\underline{u}_T(n) = \underline{e}_T(n) - j \times x_k(n) \times \underline{i}_T(n)$$

with $\underline{i}_T(n) = \underline{i}_G/(1 + n \times \Delta u)$ and $$\underline{e}_T(n) = \underline{u}_G \times (1 + n \times \Delta u)$$

$$\underline{u}_T(n \pm 1) = \underline{e}_T(n \pm 1) - j \times x_k(n \pm 1) \times \underline{i}_T(n \pm 1)$$
$$= \underline{e}_T(n \pm 1) - j \times (x_k(n) \pm \Delta x) \times \underline{i}_G(n \pm 1)/(1 + (n \pm 1) \times \Delta u)$$
$$\approx \underline{e}_T(n \pm 1) - j \times (x_k(n) \pm \Delta x) \times \underline{i}_G(n)/(1 + (n \pm 1) \times \Delta u)$$

with $\underline{e}_T(n\pm 1) = \underline{u}_G \times (1+(n\pm 1) \times \Delta u)$ and j being the imaginary number.

Thus, an individual OLTC regulator for the on-load tap-changer equipped step-up transformer is no more necessary and saves costs. In addition, engineering, commissioning and maintenance costs can be reduced.

In addition, as the time basis for regulations for generator excitation on the one hand and the step-up transformer are quite different, (indeed OLTC regulation is quite slower than the generation excitation regulation) there is no need to have a more performant microprocessor to carry out the calculations as described above.

The present solution takes advantage of an interaction of OLTC regulation and over- and under-excitation limiters $OEL_G$, $UEL_G$ of the generator excitation control. This allows an improved behaviour of the whole power excitation chain 1 in case of grid disturbances. The solution can be realised independently from the configuration, if the OLTC regulation function is implemented in a dedicated separate hardware device, as a software function in the generator excitation control, or in a superordinate control system.

What is claimed is:

1. An on-load tap changer control method for a power excitation chain, said chain including:
 a generator,
 a step-up transformer equipped with an on-load tap changer and connected on the one hand to the output of said generator and on the other hand to a transmission bus, and
 an excitation control system comprising a generator automatic voltage regulator ($AVR_G$) and at least one excitation limiter ($OEL_G$, $UEL_G$), said method comprising:
 monitoring the excitation conditions of the generator,
 activating said at least one excitation limiter ($OEL_G$, $UEL_G$) when the monitored excitation conditions are outside a predefined range,
 inhibiting temporarily a change of step of said on-load tape changer, when said excitation limiter ($OEL_G$, $UEL_G$) is active.

2. The on-load tap changer control method according to claim 1, where the excitation limiter is an over-excitation limiter ($OEL_G$), said monitoring step of excitation conditions comprising monitoring the generator stator current ($i_G$) or the generator excitation current ($i_f$), and the step of temporally inhibition of change of step of said on-load step changer comprising to block step up of said on-load tap changer.

3. The on-load tap changer control method according to claim 2, where said over-excitation limiter ($OEL_G$) is activated when the monitored generator stator current ($i_G$) or the generator excitation current ($i_f$) exceed a maximum value ($i_{G\,max}$; $i_{fmax}$).

4. The on-load tap changer control method according to claim 2, further comprising a further step of calculating of the remaining time for the over-excitation limiter ($OEL_G$) to send out an excitation current control command, and to step down said on-load step changer when said remaining time ($T_{REM}$) is equal or lower to a predefined minimum remaining time value.

5. The on-load tap changer control method according to claim 1, where the excitation limiter is an under-excitation limiter ($UEL_G$), said monitoring step of excitation conditions comprising monitoring the stability operation regime of the generator, and the step of temporally inhibition of change of step of said on-load tap changer comprising to block step down of said on-load tap changer.

6. The on-load tap changer control method according to claim 5, where said under-excitation limiter ($UEL_G$) is activated when the monitored stability operation regime is close to a predetermined stability limit.

7. The on-load tap changer control method for a power excitation chain according to claim 5, further comprising monitoring the generator stator voltage, and to step up said on-load step changer when said generator voltage is equal or exceeds to a predefined maximum generator stator voltage.

8. The on-load tap changer control method according to claim 1, further comprising:
 measuring the generator voltage ($u_G$) and generator current ($i_G$),
 processing said measured generator voltage ($u_G$) and generator current ($i_G$) in order to derive a control parameter for controlling said on load tap changer, and
 controlling said on-load tap changer.

9. The on load tap changer control method according to claim 8, where said control parameter is the secondary voltage of said step-up transformer.

10. An on-load tap changer control unit for a power excitation chain, said chain comprising
 a generator,
 a step-up transformer equipped with an on-load tap changer and connected on the one hand to the output of said generator and on the other hand to a transmission bus, and
 an excitation control system comprising a generator automatic voltage regulator ($AVR_G$) and at least one excitation limiter ($OEL_G$, $UEL_G$), said excitation control system being configured to monitor the excitation conditions of the generator and to activate said at least one excitation limiter ($OEL_G$, $UEL_G$) when the monitored excitation conditions are outside a predefined range,
 where said on-load tap changer control unit comprises means configured to inhibit temporarily a change of step of said on-load tap changer, when said excitation limiter ($OEL_G$, $UEL_G$) is active.

11. A power excitation chain comprising
 a generator,
 a step-up transformer equipped with an on-load tap changer and connected on the one hand to the output of said generator and on the other hand to a transmission bus, and
 an excitation control system including a generator automatic voltage regulator ($AVR_G$) and at least one excitation limiter ($OEL_G$, $UEL_G$), said excitation control system being configured to monitor the excitation conditions of the generator and to activate said at least one excitation limiter ($OEL_G$, $UEL_G$) when the monitored excitation conditions are outside a predefined range, and
 an on-load tap changer control unit including means configured to inhibit temporarily a change of step of said on-load tap changer, when said excitation limiter ($OEL_G$, $UEL_G$) is active.

12. The power excitation chain according to claim 11, where said excitation control system comprises an over-excitation limiter ($OEL_G$) and an under-excitation limiter ($UEL_G$).

13. The power excitation chain according to claim 11, where said on-load tap changer control unit is implemented in said generator excitation control system.

14. The power excitation chain according to claim 11, wherein the excitation control system comprises
 at least one input connectable to the generator for measuring the generator voltage ($u_G$) and generator current ($i_G$), and
 at least one processing unit to control the excitation of the generator in function of the measured generator voltage ($u_G$) and generator current ($i_G$),
wherein
 said at least one processing unit includes said on-load tap changer control unit, is connected to said on load tap changer and is furthermore configured to derive from said measured generator voltage ($u_G$) and generator current ($i_G$) a control parameter for controlling said on load tape changer.

* * * * *